United States Patent
Jo et al.

(10) Patent No.: US 11,927,724 B2
(45) Date of Patent: Mar. 12, 2024

(54) OPTICAL IMAGING SYSTEM

(71) Applicant: SAMSUNG ELECTRO-MECHANICS CO., LTD., Suwon-si (KR)

(72) Inventors: Yong Joo Jo, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 295 days.

(21) Appl. No.: 17/367,761

(22) Filed: Jul. 6, 2021

(65) Prior Publication Data

US 2021/0333511 A1 Oct. 28, 2021

Related U.S. Application Data

(63) Continuation of application No. 16/287,316, filed on Feb. 27, 2019, now Pat. No. 11,092,781.

(30) Foreign Application Priority Data

Mar. 27, 2018 (KR) .................. 10-2018-0034965
Aug. 6, 2018 (KR) .................. 10-2018-0091268

(51) Int. Cl.
*G02B 13/00* (2006.01)
*G02B 9/34* (2006.01)
(Continued)

(52) U.S. Cl.
CPC ............. *G02B 13/004* (2013.01); *G02B 9/34* (2013.01); *H04N 23/57* (2023.01); *H04N 25/53* (2023.01)

(58) Field of Classification Search
CPC ........ G02B 13/004; G02B 9/34; H04N 23/57; H04N 25/53
See application file for complete search history.

(56) References Cited

U.S. PATENT DOCUMENTS

| 9,817,212 B1 | 11/2017 | Shi et al. | |
| 2005/0046970 A1* | 3/2005 | Amanai | G02B 13/004 |
| | | | 359/771 |

(Continued)

FOREIGN PATENT DOCUMENTS

| CN | 101046546 A | 10/2007 |
| CN | 103743387 A | 4/2014 |

(Continued)

OTHER PUBLICATIONS

Wang, Kai Lun, Document ID : TW 201433817 A, Published on Sep. 1, 2014, Title:Optical Imaging Lens and Electronic Device Comprising The Same (Year: 2014).*

(Continued)

*Primary Examiner* — Joseph P Martinez
*Assistant Examiner* — Vipin Patel
(74) *Attorney, Agent, or Firm* — NSIP Law

(57) ABSTRACT

An optical imaging system is provided. The optical imaging system has a first lens, a second lens, a third lens, and a fourth lens disposed in order from an object-side to an image-side. The optical imaging system satisfies the following conditional expressions: F No.≤1.5, 0.5<EPD/TTL<0.7, where EPD is an entrance pupil diameter, and TTL is a distance from an object-side surface of the first lens to an imaging plane.

11 Claims, 6 Drawing Sheets

(51) Int. Cl.
  *H04N 23/57*     (2023.01)
  *H04N 25/53*     (2023.01)

(56) References Cited

U.S. PATENT DOCUMENTS

| | | |
|---|---|---|
| 2007/0229981 A1 | 10/2007 | Sato et al. |
| 2008/0180816 A1 | 7/2008 | Nakamura |
| 2012/0236421 A1 | 9/2012 | Tsai et al. |
| 2016/0018629 A1 | 1/2016 | Tang et al. |
| 2016/0170176 A1 | 6/2016 | Liao et al. |
| 2017/0010440 A1* | 1/2017 | Teraoka ............... G02B 13/004 |
| 2017/0038558 A1* | 2/2017 | Yang ................... G02B 27/0025 |
| 2018/0074288 A1* | 3/2018 | Lin ........................ G02B 9/34 |
| 2019/0196141 A1 | 6/2019 | Wang |

FOREIGN PATENT DOCUMENTS

| | | |
|---|---|---|
| CN | 107219610 A | 9/2017 |
| CN | 107315236 A | 11/2017 |
| CN | 107807438 A | 3/2018 |

OTHER PUBLICATIONS

Chinese Office Action dated Sep. 24, 2021 issued in counterpart Chinese Patent Application No. 201910227523.2. (5 pages in English and 7 pages in Chinese).
Chinese Office Action dated Mar. 12, 2021 in counterpart Chinese Patent Application No. 201910227523.2 (5 pages in English, 6 pages in Chinese).

* cited by examiner

OPTICAL IMAGING SYSTEM

CROSS-REFERENCE TO RELATED APPLICATIONS

This application is a Continuation Application of U.S. patent application Ser. No. 16/287,316, filed on Feb. 27, 2019, which claims the benefit under 35 USC § 119(a) of Korean Patent Application No. 10-2018-0034965 filed on Mar. 27, 2018 and Korean Patent Application No. 10-2018-0091268 filed on Aug. 6, 2018 in the Korean Intellectual Property Office, the entire disclosures of which are incorporated herein by references for all purposes.

BACKGROUND

1. Field

This application relates to an optical imaging system which implements a bright image.

2. Description of Related Art

An optical system implemented in a camera mounted on a small-sized terminal device has a relatively short length. Thus, it may be difficult to implement a low F No., and a high-resolution image may not be obtained from cameras used for small-sized terminal devices in low luminance conditions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, and a fourth lens disposed in order from an object-side to an image-side, wherein the optical imaging system may satisfy the following conditional expressions: F No.≤1.5, 0.5<EPD/TTL<0.7, where EPD is an entrance pupil diameter, and TTL is a distance from an object-side surface of the first lens to an imaging plane.

The first lens may have positive refractive power.
The second lens may have positive refractive power.
The third lens may have positive refractive power.
The fourth lens may have negative refractive power.
The first lens may have a concave image-side surface.
The second lens may have a convex image-side surface.
The fourth lens may have a concave object-side surface.

In another general aspect, an optical system includes a plurality of lenses disposed in order from an object-side to an image-side, wherein the optical imaging system may satisfy the following conditional expressions: F No. 1.5, 4.0<(f1+f2)/f<8.0, where f is an overall focal length of the optical imaging system, f1 is a focal length of a first lens disposed most adjacent to an object-side, and f2 is a focal length of a second lens disposed adjacent to the first lens.

The plurality of lenses may include four lenses.
The first lens and the second lens may have positive refractive power.

The optical imaging system may satisfy the following conditional expression: 1.0<TTL/f<2.0, where TTL is a distance from an object-side surface of the first lens to an imaging plane.

The optical imaging system may satisfy the following conditional expression: 0.3<R1/TTL<5.0, where R1 is a radius of curvature of an object-side surface of the first lens, and TTL is a distance from an object-side surface of the first lens to an imaging plane.

The optical imaging system may satisfy the following conditional expression: 0.5<f3/f<0.8, where f3 is a focal length of a third lens disposed adjacent to the second lens.

The optical imaging system may satisfy the following conditional expression: −2.0<f4/f<−0.5, where f4 is a focal length of a fourth lens disposed adjacent to a third lens.

The optical imaging system may satisfy the following conditional expression: −0.5<R1/R3<1.0, where R1 is a radius of curvature of an object-side surface of the first lens, and R3 is a radius of curvature of an object-side surface of the second lens.

Other features and aspects will be apparent from the following detailed description, the drawings, and the claims.

Figure 1:
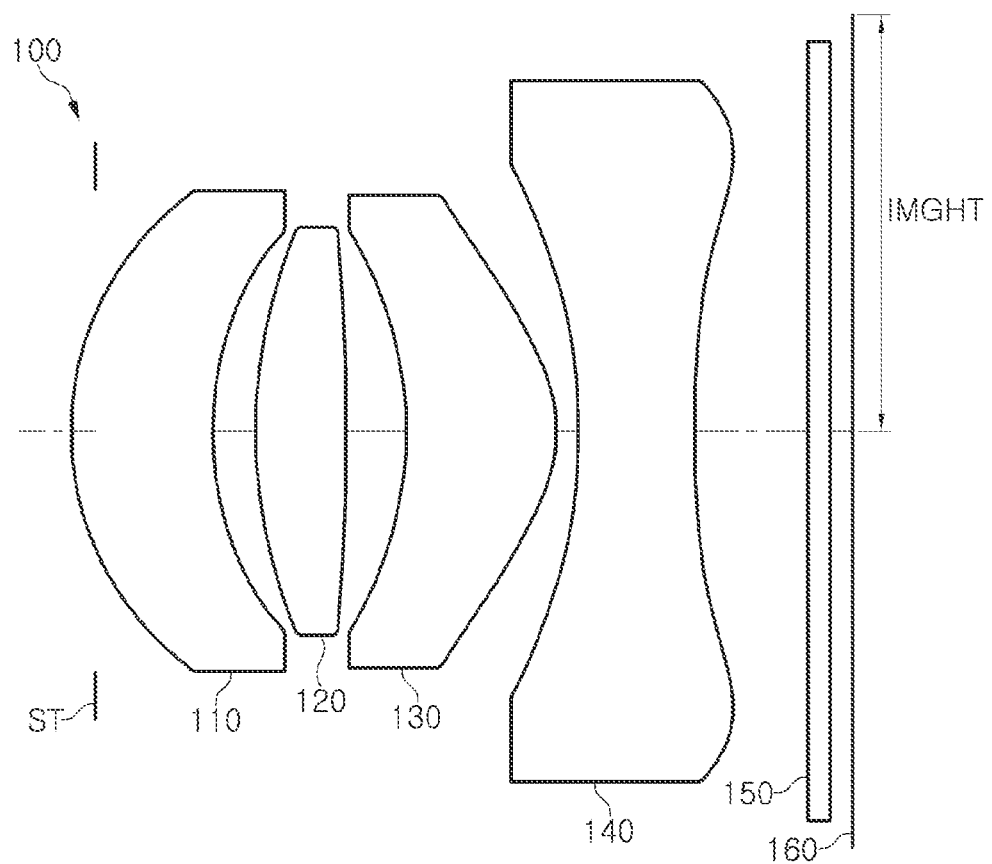
FIG. 1 is a diagram illustrating a first example of an optical imaging system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, embodiments of the present disclosure will be described as follows with reference to the attached drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first" or "second" may be used to explain various components, the components are not limited to the terms. Each of these terminologies is not used to define an essence, order, or sequence of a corresponding component but may be used merely to distinguish the corresponding component from other component(s). For example, a "first" component may be referred to as a "second" component, or similarly, and the "second" component may be referred to as the "first" component within the scope of the right according to the concept of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular embodiments only and is not intended to be limiting. For example, as used herein, the singular forms "a," "an," and "the," are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

Throughout the specification, units of a radius of curvature, a thickness, a distance, a focal length, and the like, of a lens are "millimeters," and a unit of an angle is "degrees."

Throughout the specification, a shape of a lens refers to a shape of a paraxial region of a lens. For example, the notion that an object-side surface of a first lens is convex implies that a paraxial region of an object-side surface of the first lens is convex. Thus, when it is described that an object-side surface of a lens is convex, it does not indicate that an overall object-side surface of a lens is convex. For example, even when it is described that an image-side surface of the first lens has a concave shape, an edge of an image-side surface of a first lens may have a convex shape. The paraxial region mentioned above may refer to a region including an optical axis.

In the exemplary embodiments, an optical imaging system may include a plurality of lenses disposed along an optical axis. For example, the optical imaging system may include, for example, a first lens, a second lens, a third lens, and a fourth lens disposed in order from an optical axis. The first lens may refer to a lens disposed most adjacent to an object (or a subject), and the fourth lens may refer to a lens disposed adjacent to an imaging plane or an image sensor.

In the description below, an optical imaging system will be described in greater detail.

The optical imaging system may include a plurality of lenses. For example, the optical imaging system may include a first lens, a second lens, a third lens, and a fourth lens disposed in order from an object-side to an image-side.

The optical imaging system may further include an image sensor and a filter. The image sensor may form an imaging plane, and may convert light refracted by the first to fourth lenses into an electrical signal. A filter may be disposed between a lens and the imaging plane, and may block infrared light incident to the imaging plane.

The optical imaging system may further include a stop and a spacer. The stop may be disposed in a front region of the first lens and between lenses, but is not limited thereto, and may adjust light incident onto the imaging plane. The spacer may be disposed between lenses and may maintain gaps between the lenses. The spacer may be formed of a light shielding material such that the spacer may block unnecessary light penetrating into a rib of a lens.

In the description below, the lenses included in the optical imaging system will be described in greater detail.

The first lens may have refractive power. For example, the first lens may have positive refractive power. The first lens may have one surface having a convex shape. For instance, an object-side surface of the first lens may have a convex shape. The first lens may include an aspherical surface. For example, one surface of the first lens may be an aspherical surface.

The second lens may have refractive power. For example, the second lens may have positive refractive power. The second lens may have a convex surface. For example, an image-side surface of the second lens may have a convex shape. The second lens may have a spherical surface or an aspherical surface. For example, both surfaces of the second lenses may be spherical surfaces or aspherical surfaces.

The third lens may have refractive power. For example, the third lens may have positive refractive power. The third lens may have a concave surface. For example, an object-side surface of the third lens may have a concave shape. The third lens may include an aspherical surface. For example, one surface or both surfaces of the third lens may be an aspherical surface.

The fourth lens may have refractive power. For example, the fourth lens may have negative refractive power. One surface of the fourth lens may have a concave shape. For example, at least one of an object-side surface and an image-side surface of the fourth lens may have a concave shape. The fourth lens may have a shape having an inflection point. For example, an inflection point may be formed on at least one of an object-side surface and an image-side surface of the fourth lens. Thus, at least one surface of the fourth lens may be configured such that a shape of a paraxial region may be different from a shape of a peripheral region. For example, the fourth lens may be configured such that a paraxial region may be concave, and an edge of the paraxial region, that is, a peripheral region outside of the paraxial region, may be convex. The fourth lens may include an aspherical surface. For example, one surface of the fourth lens may be an aspherical surface.

Aspherical surfaces of the first to fourth lenses may be represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + ...$$

Equation 1

In Equation 1 above, "c" is a curvature of the lens (a reciprocal number of a radius of a curvature), "K" is a conic constant, "Y" is a distance from a certain point on an aspherical surface of the lens to an optical axis, constants "A" to "H" are aspherical surface constants. "Z" (or SAG) indicates a distance from a certain point on an aspherical surface of the lens to a vertex of the aspherical surface in an optical axis direction.

The optical imaging system may satisfy one or more of the conditional expressions below:

1.0<TTL/f<2.0 (Conditional Expression 1)

0.3<R1/TTL<5.0 (Conditional Expression 2)

0.5<EPD/TTL<0.7 (Conditional Expression 3)

4.0<(f1+f2)/f<8.0 (Conditional Expression 4)

0.5<f3/f<0.8 (Conditional Expression 5)

−2.0<f4/f<−0.5 (Conditional Expression 6)

−0.5<R1/R3<1.0 (Conditional Expression 7)

0.8<F No.<1.5 (Conditional Expression 8)

In the conditional expressions above, TTL is a distance from an object-side surface of the first lens to an imaging plane, f is an overall focal length of the optical imaging system, R1 is a radius of curvature of an object-side surface of the first lens, EPD is an entrance pupil diameter, f1 is a focal length of the first lens, f2 is a focal length of the second lens, f3 is a focal length of the third lens, f4 is a focal length of the fourth lens, R3 is a radius of curvature of an object-side surface of the second lens, and F No (f-number) is the ratio of the focal length to the diameter of the entrance pupil.

In the description below, examples of an optical imaging system will be described.

First Example

Figure 2:
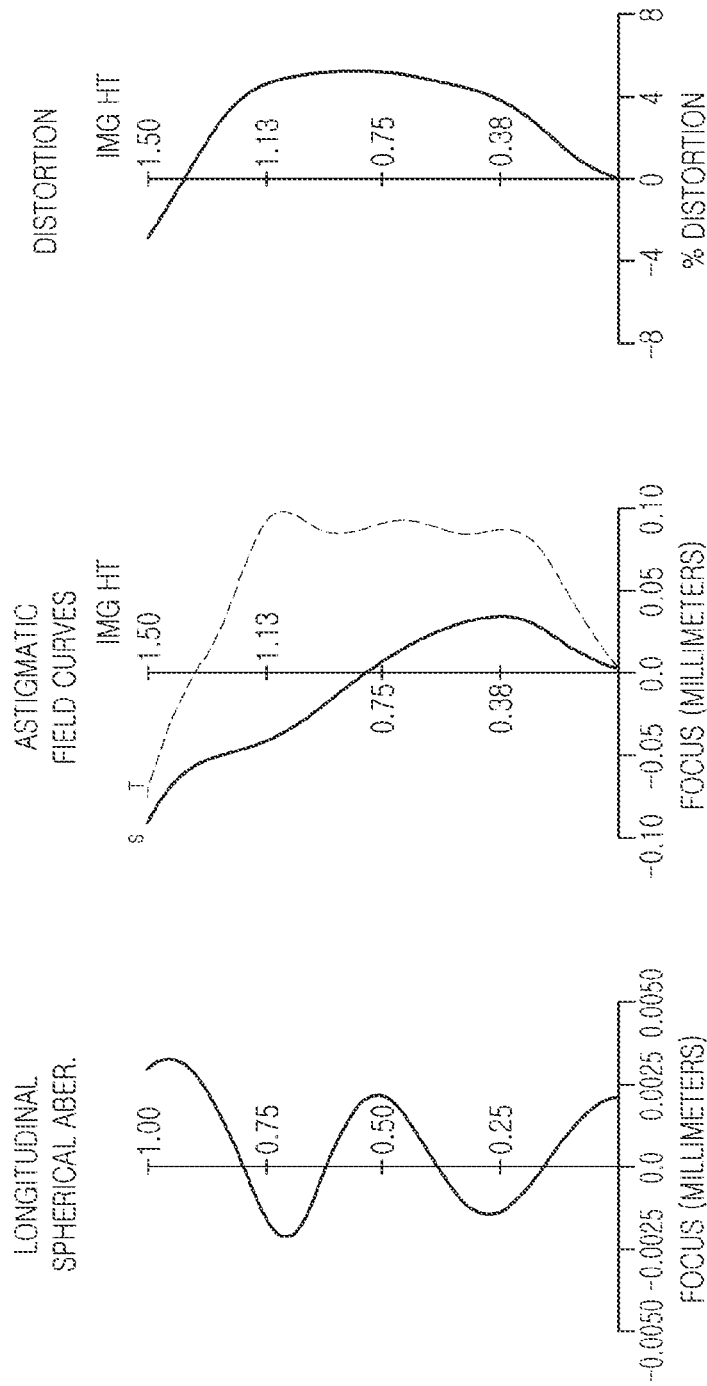
FIG. 2 illustrates examples of aberration curves of an optical imaging system illustrated in FIG. 1.

FIG. 1 is a diagram illustrating a first example of an optical imaging system. FIG. 2 illustrates examples of aberration curves of an optical imaging system illustrated in FIG. 1.

The optical imaging system 100 as illustrated in FIG. 1 may include a first lens 110, a second lens 120, a third lens 130, and a fourth lens 140.

The first lens 110 may have positive refractive power, and may have a convex object-side surface, and a concave image-side surface. The second lens 120 may have positive refractive power, and may have a convex object-side surface, and a convex image-side surface. The third lens 130 may have positive refractive power, and may have a convex object-side surface, and a convex image-side surface. The fourth lens 140 may have negative refractive power, and may have a concave object-side surface, and a concave image-side surface. The fourth lens 140 may have a shape in which an inflection point is formed in an object-side surface and an image-side surface.

The optical imaging system 100 may further include a stop ST, a filter 150, and an image sensor 160. The stop ST may be disposed on a front region of the first lens 110 at an object-side, and may adjust the amount of light incident to the image sensor 160. The filter 150 may be disposed between the fourth lens 140 and the image sensor 160, and may block infrared light. The image sensor 160 may form an imaging plane on which a subject may be imaged.

Table 1 below lists characteristics of lenses included in the optical imaging system, and Table 2 lists aspherical values of the lenses. In Table 1, "*" indicates that a respective surface is an aspherical surface.

TABLE 1

First Example

F No. = 0.9895  EPD =
f = 2.10  Radius  2.12  TTL = 3.510

| Surface No. | Remark | Radius of Curvature | Thickness/ Distance | Focal length | Index | Abbe No. |
|---|---|---|---|---|---|---|
| S1 | Stop | infinity | −0.1020 | | | |
| S2 | 1st lens | 1.3010 | 0.6370 | 8.110 | 1.535 | 56.11 |
| S3* | | 1.5400 | 0.1880 | | | |
| S4 | 2nd lens | 2.2480 | 0.4050 | 3.492 | 1.535 | 56.11 |
| S5 | | −10.3840 | 0.2710 | | | |
| S6 | 3rd lens | −1.6890 | 0.6700 | 1.570 | 1.535 | 56.11 |
| S7* | | −0.6390 | 0.1000 | | | |
| S8 | 4th lens | −2.4300 | 0.5300 | −2.896 | 1.535 | 56.11 |
| S9* | | 4.6080 | 0.5000 | | | |
| S10 | Filter | infinity | 0.1070 | | 1.508 | 64.17 |
| S11 | | infinity | 0.1020 | | | |
| S12 | Imaging plane | infinity | 0.0000 | | | |

TABLE 2

| Surface No. | S3 | S7 | S9 |
|---|---|---|---|
| K | 0 | 0 | 0 |
| A | 0 | −4.1599 | 0 |
| B | −0.0438 | −0.5809 | −0.0755 |
| C | 0.43475 | 1.49026 | 0.24444 |
| D | −0.9248 | −1.9672 | −0.2012 |
| E | 1.04091 | 1.30011 | 0.05553 |
| F | −0.44 | −0.3324 | −0.0049 |
| G | 0 | 0 | 0 |
| H | 0 | 0 | 0 |

Second Example

Figure 3:
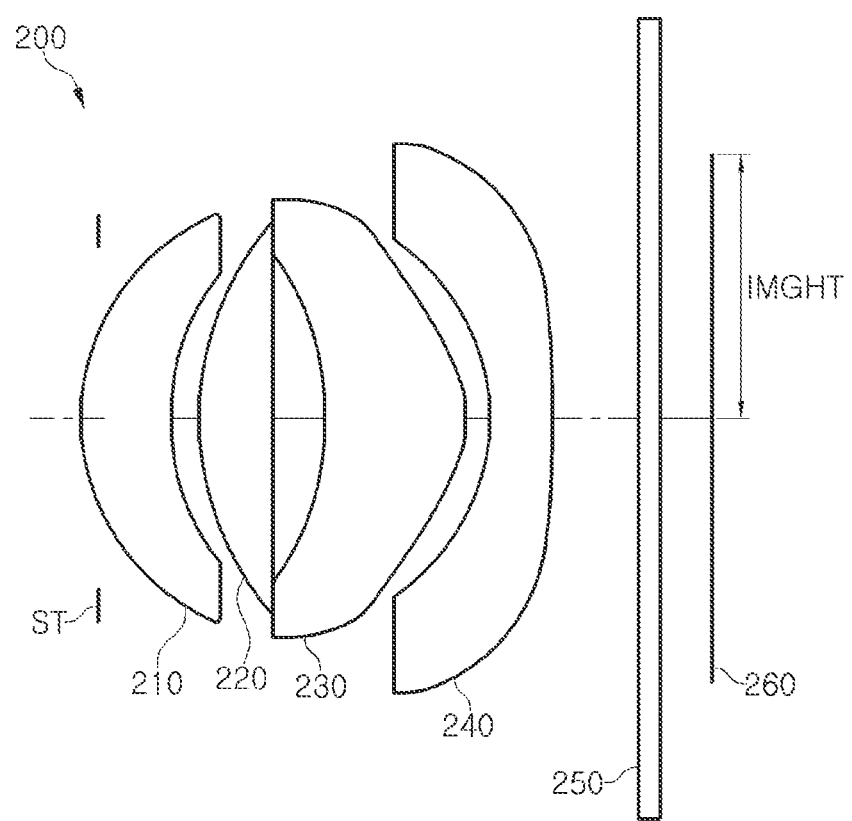
FIG. 3 illustrates a second example of an optical imaging system.
Figure 4:
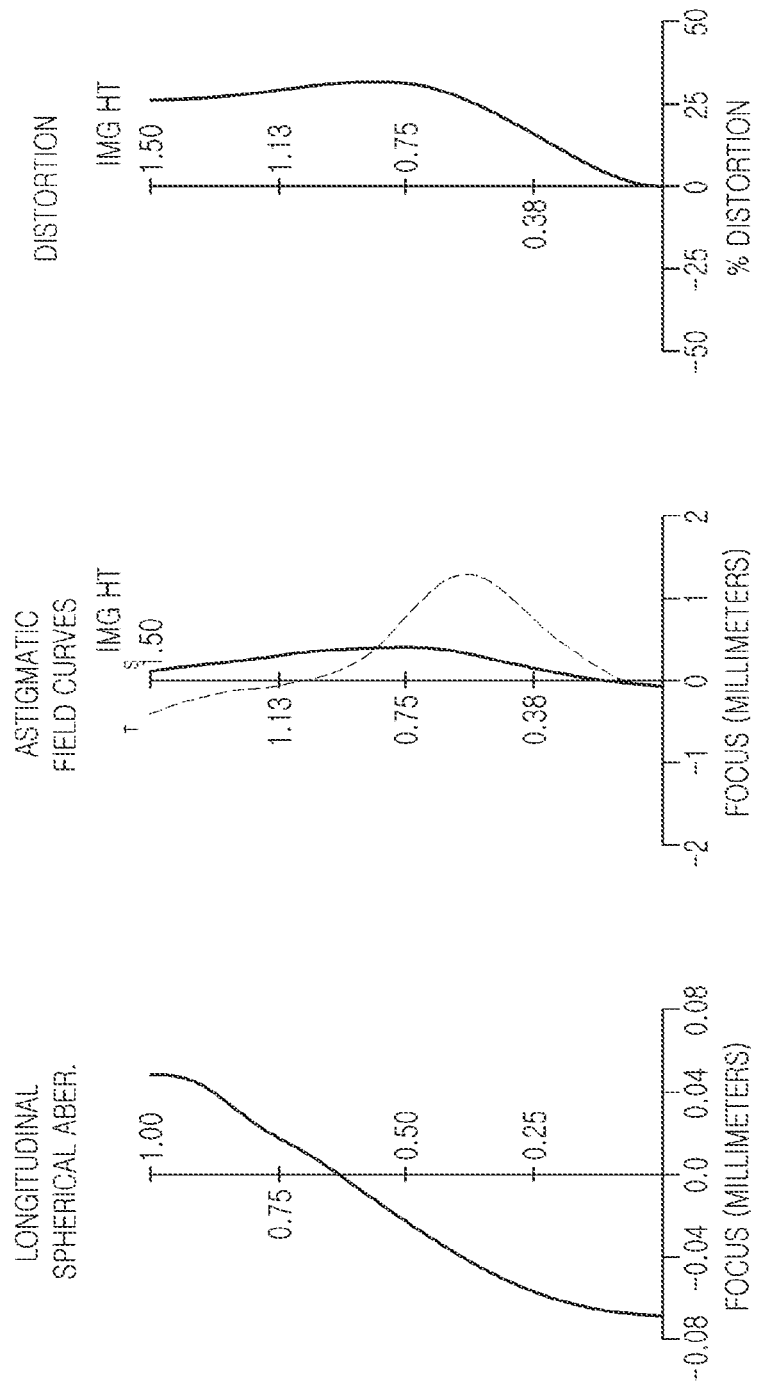
FIG. 4 illustrates examples of aberration curves of an optical imaging system illustrated in FIG. 3.

FIG. 3 is a second example of an optical imaging system. FIG. 4 illustrates aberration curves of an optical imaging system illustrated in FIG. 3.

An optical imaging system 200, as illustrated in FIG. 2, may include a first lens 210, a second lens 220, a third lens 230, and a fourth lens 240.

The first lens 210 may have positive refractive power, and may have a convex object-side surface, and a concave image-side surface. The second lens 220 may have positive refractive power, and may have a convex object-side surface, and a convex image-side surface. The third lens 230 may have positive refractive power, and may have a concave object-side surface, and a convex image-side surface. The fourth lens 240 may have negative refractive power, and may have a concave object-side surface, and a convex image-side surface. The fourth lens 240 may also have a shape in which an inflection point is formed in an object-side surface and an image-side surface.

The optical imaging system 200 may further include a stop ST, a filter 250, and an image sensor 260. The stop ST may be disposed in a front region of the first lens 210, and may adjust light incident to the image sensor 260. The filter 250 may be disposed between the fourth lens 240 and the image sensor 260, and may block infrared light. The image sensor 260 may form an imaging plane on which a subject may be imaged. A half of a diagonal length of the imaging plane (IMG HT) may be relatively smaller than an effective radius of the fourth lens.

Table 3 below lists characteristics of lenses included in the optical imaging system, and Table 4 lists aspherical values of the lenses. In Table 3, "*" indicates that a respective surface is an aspherical surface.

TABLE 3

Second Example

| | | F No. = 1.087 | | EPD = | |
|---|---|---|---|---|---|
| f = 2.10 | | Radius | | 1.93 | TTL = 3.552 |
| Surface No. | Remark | of Curvature | Thickness/ Distance | Focal length | Index | Abbe No. |
|---|---|---|---|---|---|---|
| S1 | Stop | infinity | −0.1020 | | | |
| S2 | 1st lens | 1.2730 | 0.5090 | 10.444 | 1.535 | 56.11 |
| S3* | | 1.4180 | 0.1550 | | | |
| S4 | 2nd lens | 1.7450 | 0.4140 | 3.218 | 1.535 | 56.11 |
| S5 | | −124.5900 | 0.2940 | | | |
| S6 | 3rd lens | −1.6490 | 0.7930 | 1.429 | 1.535 | 56.11 |
| S7* | | −0.6100 | 0.1390 | | | |
| S8 | 4th lens | −1.2290 | 0.3470 | −3.055 | 1.535 | 56.11 |
| S9* | | −5.4310 | 0.5000 | | | |
| S10 | Filter | infinity | 0.1070 | | 1.508 | 64.17 |
| S11 | | infinity | 0.2240 | | | |
| S12 | Imaging plane | infinity | 0.0700 | | | |

TABLE 4

| Surface No. | S3 | S7 | S9 |
|---|---|---|---|
| K | 0 | 0 | 0 |
| A | 0 | −4.30632 | 0 |
| B | −0.03222 | −0.59889 | 0.15706 |
| C | 0.25944 | 1.69726 | −0.28234 |
| D | −0.52617 | −2.62138 | 0.10552 |
| E | 0.5257 | 2.02605 | 0.00386 |
| F | −0.19907 | −0.60194 | −0.00708 |
| G | 0 | 0 | 0 |
| H | 0 | 0 | 0 |

Third Example

Figure 5:
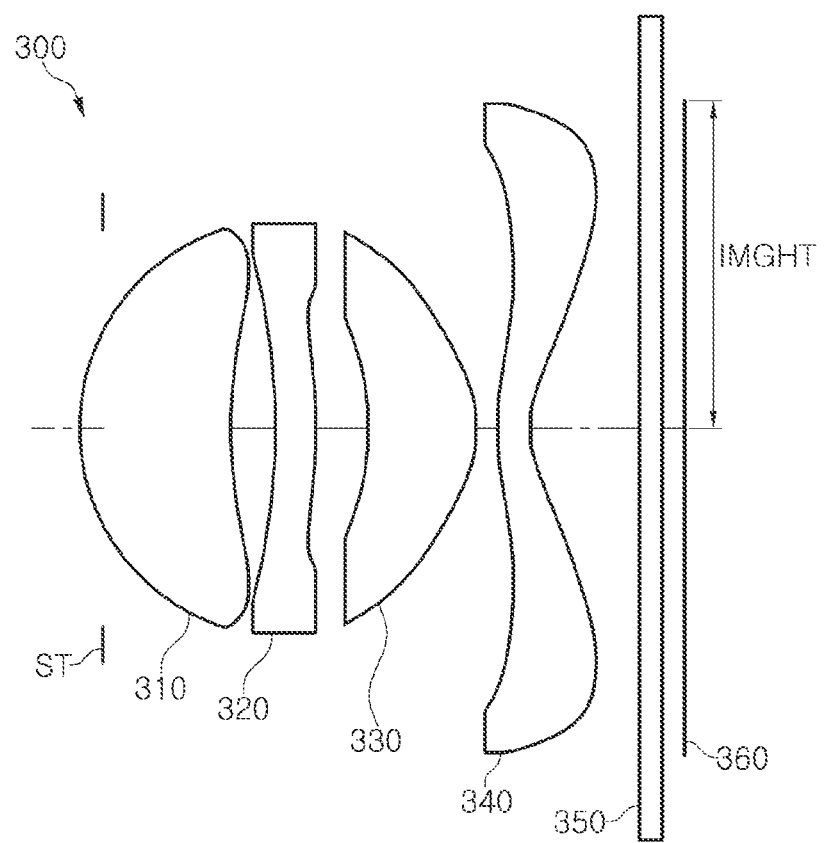
FIG. 5 illustrates a third example of an optical imaging system.
Figure 6:
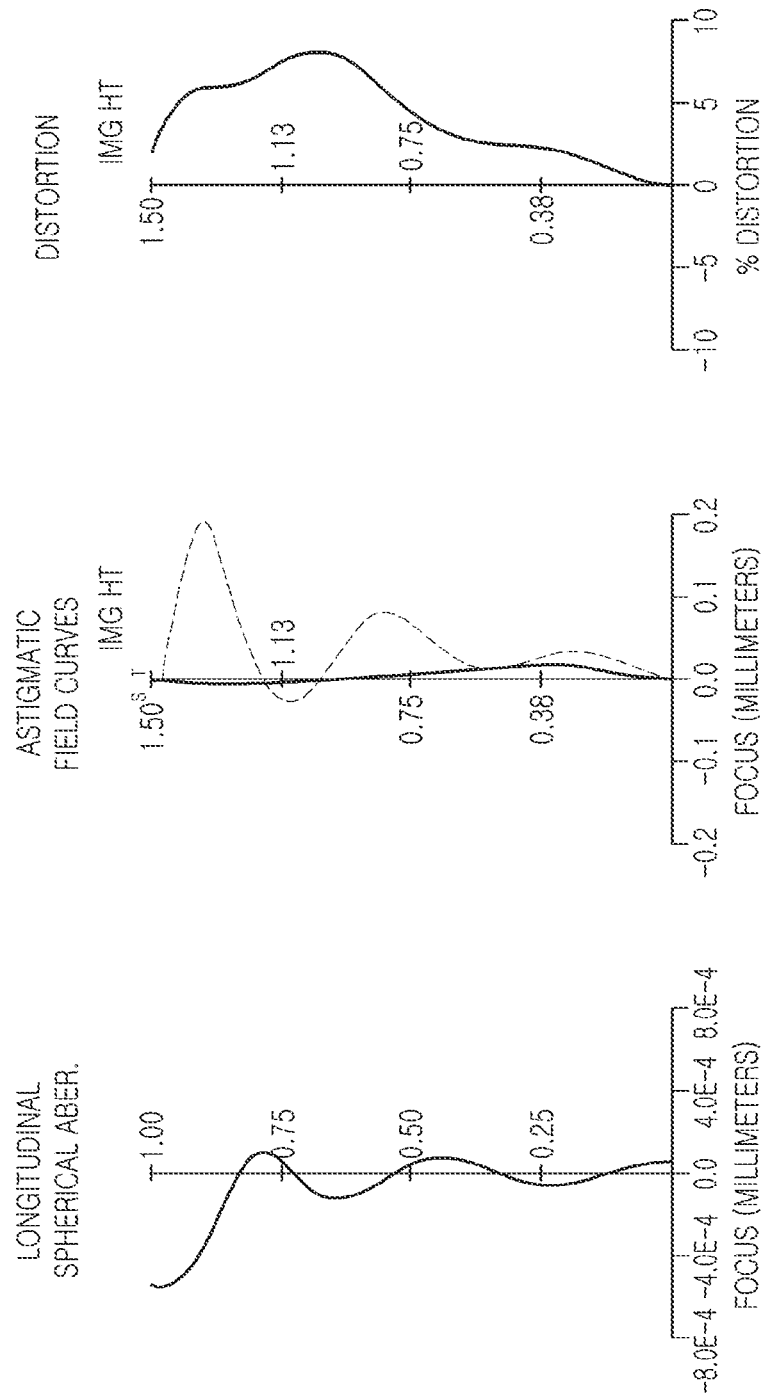
FIG. 6 illustrates examples of aberration curves of an optical imaging system illustrated in FIG. 5.

FIG. 5 is a third example of an optical imaging system. FIG. 6 illustrates examples of aberration curves of an optical imaging system illustrated in FIG. 5.

An optical imaging system 300, as illustrated in FIG. 2, may include a first lens 310, a second lens 320, a third lens 330, and a fourth lens 340.

The first lens 310 may have positive refractive power, and may have a convex object-side surface, and a concave image-side surface. The second lens 320 may have positive refractive power, and may have a concave object-side surface, and a convex image-side surface. The third lens 330 may have positive refractive power, and may have a concave object-side surface, and a convex image-side surface. The fourth lens 340 may have negative refractive power, and may have a convex object-side surface, and a concave image-side surface. The fourth lens 340 may have a shape in which an inflection point is formed in an object-side surface and an image-side surface.

The optical imaging system 300 may further include a stop ST, a filter 350, and an image sensor 360. The stop ST may be disposed on a front region of the first lens 310, and may adjust light incident to the image sensor 360. The filter 350 may be disposed between the fourth lens 350 and the image sensor 360, and may block infrared light. The image sensor 360 may form an imaging plane on which a subject may be imaged. A half of a diagonal length of the imaging plane may be relatively smaller than an effective radius of the fourth lens.

Table 5 below lists characteristics of lenses included in the optical imaging system, and Table 6 lists aspherical values of the lenses. In Table 5, "*" indicates that a respective surface is an aspherical surface.

TABLE 5

Third Example

| | | f = 2.10 | | F No. = 1.322 | | | |
|---|---|---|---|---|---|---|---|
| Sur- face No. | Remark | Radius of Curvature | Thickness/ Distance | EPD = 1.58 Focal length | TTL = 2.780 Index | Abbe No. |
|---|---|---|---|---|---|---|
| S1 | Stop | infinity | −0.1020 | | | |
| S2 | 1st lens | 0.9640 | 0.6940 | 2.591 | 1.526 | 56.27 |
| S3* | | 2.4770 | 0.2030 | | | |
| S4* | 2nd lens | −4.0130 | 0.1850 | 12.146 | 1.613 | 23.42 |
| S5* | | −2.6530 | 0.2430 | | | |
| S6* | 3rd lens | −1.1530 | 0.5000 | 1.170 | 1.535 | 56.11 |
| S7* | | −0.4670 | 0.1000 | | | |
| S8 | 4th lens | 1.4660 | 0.1480 | −1.187 | 1.535 | 56.11 |
| S9* | | 0.4280 | 0.5000 | | | |
| S10 | Filter | infinity | 0.1070 | | 1.508 | 64.17 |
| S11 | | infinity | 0.1000 | | | |
| S12 | Imaging plane | infinity | 0.0000 | | | |

TABLE 6

| Surface No. | S3 | S4 | S5 | S6 | S7 | S9 |
|---|---|---|---|---|---|---|
| K | 0 | 0 | 0 | 0 | 0 | 0 |
| A | 0 | 0 | 0 | −0.82226 | −4.15824 | −4.32059 |
| B | −0.00538 | −0.13915 | 0.23165 | 0.20244 | −0.23833 | −0.49449 |
| C | 0.13325 | −0.59615 | −1.38669 | −0.61768 | −0.91518 | 0.88575 |
| D | −1.29685 | 3.09691 | 10.26877 | 1.67688 | 4.20026 | −0.83834 |

TABLE 6-continued

| Surface No. | S3 | S4 | S5 | S6 | S7 | S9 |
|---|---|---|---|---|---|---|
| E | 2.05225 | −4.37609 | −23.4953 | −3.47853 | −6.60408 | 0.37631 |
| F | −1.36708 | 2.11171 | 23.54330 | 2.51798 | 3.18797 | −0.06700 |
| G | 0 | 0 | 0 | 0 | 0 | 0 |
| H | 0 | 0 | 0 | 0 | 0 | 0 |

Table 7 lists values of conditional expressions of the optical imaging systems in the first to third examples.

TABLE 7

| Conditional Expression | 1st Ex. | 2nd Ex. | 3rd Ex. |
|---|---|---|---|
| TTL/f | 1.67143 | 1.69135 | 1.32381 |
| R1/TTL | 0.37066 | 0.35839 | 0.34676 |
| EPD/TTL | 0.60464 | 0.54397 | 0.57136 |
| (f1 + f2)/f | 5.52462 | 6.50526 | 7.01729 |
| f3/f | 0.74748 | 0.68059 | 0.55695 |
| f4/f | −1.37919 | −1.45455 | −0.56543 |
| R1/R3 | 0.57874 | 0.72951 | −0.24022 |
| F No | 0.98950 | 1.08690 | 1.32210 |

The optical imaging system may have optical properties as noted below. For example, an overall focal length of the optical imaging system may be within a range of about 1.5 mm to about 2.5 mm, an overall length (TTL) may be within a range of about 2.5 mm to about 4.0 mm, an overall view angle (FOV) may be within a range of about 30° to about 40°, a diagonal length of an imaging plane may be within a range of about 2.5 to about 4.0 mm, and an entrance pupil diameter (EPD) may be within a range of about 1.2 mm to about 2.5 mm. A sum of the focal length of the first lens and the focal length of the second lens may be within a range of about 10 mm to about 15 mm, the focal length of the third lens may be within a range of about 1.0 mm to about 2.0 mm, and the focal length of the fourth lens may be within a range of about −4.0 mm to about −1.0 mm.

According to the aforementioned examples, an optical imaging system is implemented, which has a small size and which images an object in a low luminance condition.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising, in order from an object side to an image side:
    a first lens with positive refractive power;
    a second lens with positive refractive power;
    a third lens with positive refractive power; and
    a fourth lens with negative refractive power,
    wherein the optical imaging system has a total of four lenses, and
    wherein the optical imaging system satisfies the conditional expression:

$0.8 < F\text{ No.} < 1.35$.

2. The optical imaging system of claim 1, wherein the first lens has a convex object-side surface.

3. The optical imaging system of claim 1, wherein the second lens has a convex object-side surface and a convex image-side surface.

4. The optical imaging system of claim 1, wherein the third lens has a concave object-side surface.

5. The optical imaging system of claim 1, wherein the third lens has a convex image-side surface.

6. The optical imaging system of claim 1, wherein the fourth lens has a convex object-side surface.

7. The optical imaging system of claim 1, wherein the fourth lens has a concave image-side surface.

8. The optical imaging system of claim 1, wherein the optical imaging system satisfies the following conditional expression:

$1.0 < TTL/f < 2.0$, where TTL is a distance from an object-side surface of the first lens to an imaging plane.

9. The optical imaging system of claim 1, wherein the optical imaging system satisfies the following conditional expression:

$0.3 < R1/TTL < 5.0$, where R1 is a radius of curvature of an object-side surface of the first lens, and TTL is a distance from an object-side surface of the first lens to an imaging plane.

10. The optical imaging system of claim 1, wherein the optical imaging system satisfies a conditional expression:

$0.5 < f3/f < 0.8$, where f3 is a focal length of a third lens disposed adjacent to the second lens, and where f is an overall focal length of the optical imaging system.

11. The optical imaging system of claim 1, wherein the optical imaging system satisfies a conditional expression:

$-0.5 < R1/R3 < 1.0$, where R1 is a radius of curvature of an object-side surface of the first lens, and R3 is a radius of curvature of an object-side surface of the second lens.

* * * * *